United States Patent
Rozman et al.

(10) Patent No.: US 8,536,729 B2
(45) Date of Patent: Sep. 17, 2013

(54) HYBRID ELECTRIC POWER ARCHITECTURE FOR A VEHICLE

(75) Inventors: Gregory I. Rozman, Rockford, IL (US); Steven J. Moss, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 365 days.

(21) Appl. No.: 12/796,711

(22) Filed: Jun. 9, 2010

(65) Prior Publication Data
US 2011/0304199 A1    Dec. 15, 2011

(51) Int. Cl.
*B60L 1/00*    (2006.01)

(52) U.S. Cl.
USPC .......................................... 307/9.1; 307/10.1

(58) Field of Classification Search
USPC .................................. 307/9.1, 10.1
See application file for complete search history.

(56) References Cited

U.S. PATENT DOCUMENTS

| | | | |
|---|---|---|---|
| 2,892,098 A | 6/1959 | Bergvall | |
| 4,967,097 A | 10/1990 | Mehl | |
| 5,402,053 A * | 3/1995 | Divan et al. | 318/768 |
| 5,670,851 A * | 9/1997 | Numazaki | 318/106 |
| 5,747,971 A * | 5/1998 | Rozman et al. | 322/10 |
| 6,036,508 A | 3/2000 | Anderson et al. | |
| 6,151,567 A | 11/2000 | Ames et al. | |
| 6,198,613 B1 | 3/2001 | Rozman | |
| 6,252,751 B1 | 6/2001 | Rozman | |
| 6,441,581 B1 * | 8/2002 | King et al. | 320/101 |
| 6,445,451 B1 | 9/2002 | Douglas-Hamilton et al. | |
| 6,486,568 B1 * | 11/2002 | King et al. | 307/66 |
| 6,651,441 B2 | 11/2003 | Reuter et al. | |
| 6,678,972 B2 * | 1/2004 | Naruse et al. | 37/466 |
| 6,727,609 B2 | 4/2004 | Johnsen | |
| 6,757,590 B2 | 6/2004 | Ross et al. | |
| 6,882,904 B1 | 4/2005 | Petrie et al. | |
| 7,116,010 B2 | 10/2006 | Lasseter et al. | |
| 7,127,327 B1 | 10/2006 | O'Donnell et al. | |
| 7,256,513 B2 * | 8/2007 | Kumar et al. | 307/9.1 |
| 7,304,445 B2 * | 12/2007 | Donnelly | 318/108 |
| 7,420,378 B2 | 9/2008 | Audet et al. | |
| 7,479,749 B2 | 1/2009 | Gerding et al. | |
| 7,498,777 B2 * | 3/2009 | Andrieux | 322/45 |
| 7,857,081 B2 * | 12/2010 | Kishimoto | 180/65.27 |
| 7,880,326 B2 * | 2/2011 | Khan et al. | 307/10.1 |
| 7,911,079 B2 * | 3/2011 | Hoff et al. | 307/10.1 |

(Continued)

FOREIGN PATENT DOCUMENTS

DE    274394 A1    12/1989
JP    03078401 A  *  4/1991

(Continued)

OTHER PUBLICATIONS

U.S. Appl. No. 12/557,707, filed Sep. 11, 2009.

(Continued)

*Primary Examiner* — Adi Amrany
(74) *Attorney, Agent, or Firm* — Carlson, Gaskey & Olds, PC

(57) ABSTRACT

An electric architecture for use on a vehicle has a collector bus for receiving power from a plurality of power sources. The collector bus distributes power to at least a pair of subsystems which are operable at different frequency levels. Each subsystem is provided with a global bus and a local bus, and is utilized to power at least one motor.

18 Claims, 4 Drawing Sheets

(56) References Cited

U.S. PATENT DOCUMENTS

| | | | |
|---|---|---|---|
| 7,928,597 B2* | 4/2011 | Gupta et al. | 307/9.1 |
| 8,115,334 B2* | 2/2012 | Vyas et al. | 307/10.1 |
| 2001/0013702 A1* | 8/2001 | Yanase et al. | 290/40 C |
| 2006/0119177 A1* | 6/2006 | Kumar et al. | 307/9.1 |
| 2006/0151219 A1* | 7/2006 | Khan et al. | 180/65.1 |
| 2006/0222910 A1* | 10/2006 | Aoyagi et al. | 429/12 |
| 2007/0040382 A1 | 2/2007 | Towada | |
| 2007/0103002 A1* | 5/2007 | Chiao et al. | 307/10.1 |
| 2007/0129110 A1 | 6/2007 | Lasseter et al. | |
| 2008/0087479 A1* | 4/2008 | Kang | 180/65.3 |
| 2009/0024267 A1* | 1/2009 | Kawai | 701/22 |
| 2009/0288577 A1* | 11/2009 | Kumar | 105/36 |
| 2010/0094490 A1 | 4/2010 | Alston | |
| 2010/0161162 A1* | 6/2010 | Kitanaka et al. | 701/22 |
| 2011/0080040 A1* | 4/2011 | Kumar | 307/9.1 |
| 2011/0101915 A1* | 5/2011 | Mitsutani | 320/109 |
| 2011/0133549 A1* | 6/2011 | Song | 307/10.1 |
| 2012/0001481 A1 | 1/2012 | Koeppen et al. | |
| 2012/0007428 A1* | 1/2012 | Rozman et al. | 307/66 |

FOREIGN PATENT DOCUMENTS

| | | | |
|---|---|---|---|
| JP | 09074601 A | * | 3/1997 |
| JP | 09215108 A | * | 8/1997 |
| JP | 10014133 A | * | 1/1998 |
| JP | 10215501 A | * | 8/1998 |
| JP | 2007252083 A | * | 9/2007 |
| WO | 99/00884 A1 | | 1/1999 |
| WO | WO 3098792 A1 | * | 11/2003 |
| WO | WO 2004025819 A1 | * | 3/2004 |
| WO | 2004037641 A2 | | 5/2004 |

OTHER PUBLICATIONS

Search Report from corresponding EP 11 16 8605, received Jul. 9, 2012.

* cited by examiner

| OPERATING MODE | R1 | R2 | R3 | R4 | R5 | R6 | R7 | R8 | R9 | R10 | R11 | R12 | R13 | INVERTER #1 | INVERTER #2 |
|---|---|---|---|---|---|---|---|---|---|---|---|---|---|---|---|
| IM #1 START | CLOSED | CLOSED | CLOSED | CLOSED | OPEN | CLOSED | OPEN | OPEN | OPEN | OPEN | CLOSED | OPEN | OPEN | CVCF | VVVF |
| IM #1 RUNS ON GLOBAL BUS | CLOSED | CLOSED | CLOSED | CLOSED | CLOSED | CLOSED | OPEN | OPEN | OPEN | OPEN | OPEN | OPEN | OPEN | CVCF | CVCF |
| IM #2 START | CLOSED | CLOSED | CLOSED | CLOSED | CLOSED | CLOSED | OPEN | CLOSED | OPEN | OPEN | OPEN | CLOSED | OPEN | CVCF | VVVF |
| IM #2 RUNS ON GLOBAL BUS | CLOSED | CLOSED | CLOSED | CLOSED | CLOSED | CLOSED | CLOSED | CLOSED | OPEN | OPEN | OPEN | OPEN | OPEN | CVCF | CVCF |
| IM #3 START | CLOSED | CLOSED | CLOSED | CLOSED | CLOSED | CLOSED | CLOSED | CLOSED | CLOSED | CLOSED | OPEN | OPEN | CLOSED | CVCF | VVVF |
| IM #3 RUNS ON GLOBAL BUS | CLOSED | CLOSED | CLOSED | CLOSED | OPEN | CLOSED | OPEN | CLOSED | OPEN | CLOSED | OPEN | OPEN | OPEN | CVCF | CVCF |
| ALL IMS RUN ON LOCAL BUS | CLOSED | CLOSED | CLOSED | CLOSED | CLOSED | CLOSED | CLOSED | CLOSED | CLOSED | CLOSED | CLOSED | OPEN | OPEN | CVCF | CVCF |
| ALL IMS RUN ON GLOBAL BUS | CLOSED | CLOSED | CLOSED | CLOSED | CLOSED | CLOSED | CLOSED | CLOSED | CLOSED | CLOSED | OPEN | OPEN | OPEN | CVCF | CVCF |
| INVERTER #1 FAILURE | OPEN | CLOSED | OPEN | CLOSED | CLOSED | CLOSED | CLOSED | CLOSED | CLOSED | CLOSED | CLOSED | CLOSED | CLOSED | DISABLED | CVCF |
| INVERTER #2 FAILURE | CLOSED | OPEN | CLOSED | OPEN | CLOSED | CLOSED | CLOSED | CLOSED | CLOSED | CLOSED | CLOSED | CLOSED | CLOSED | CVCF | DISABLED |

FIG.3

HYBRID ELECTRIC POWER ARCHITECTURE FOR A VEHICLE

BACKGROUND

This application relates to hybrid electric power architecture for use on a vehicle, wherein there are subsystems operating at distinct frequencies.

Many modern vehicles are being provided with complex electric power architectures. One particular example is battlefield vehicles for use in military operations.

Such vehicles consume significant amounts of fuel, and have any number of electric components that require power. Electric generators and diverse loads are often decentralized on the vehicle, and each require distinct and dedicated controllers for each component.

The requirements of all of the separate motor controllers increases the size and weight of the power architecture associated with the vehicle.

SUMMARY

An electric architecture for use on a vehicle has a collector bus for receiving power from a plurality of power sources. The collector bus distributes power to at least a pair of subsystems which are operable at different frequency levels. Each subsystem is provided with a global bus and a local bus, and is utilized to power at least one motor.

These and other features of the present invention can be best understood from the following specification and drawings, the following of which is a brief description.

BRIEF DESCRIPTION OF THE DRAWINGS

FIG. 3 is a chart showing the operation of the FIG. 2 embodiment.

DETAILED DESCRIPTION

Figure 1:
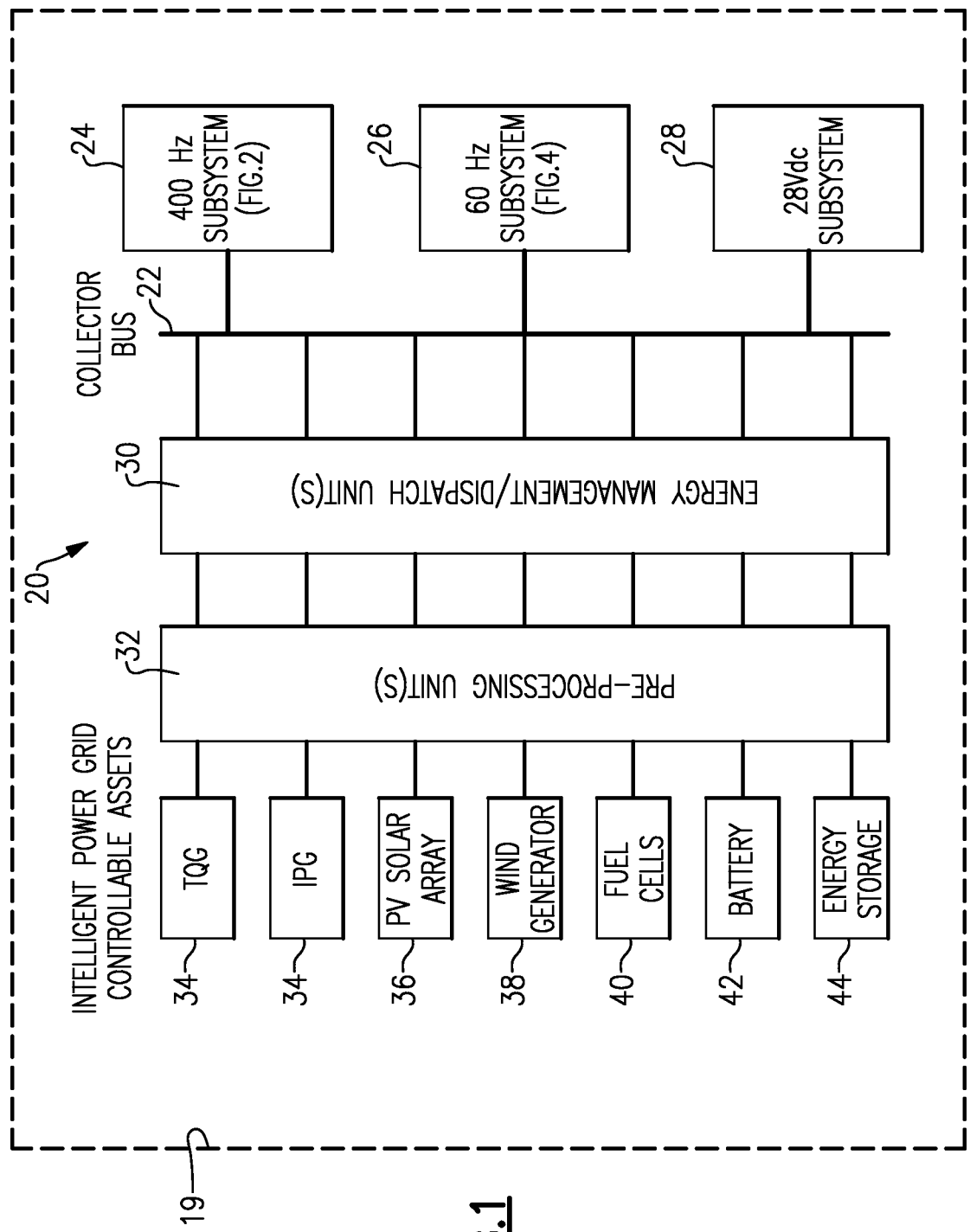
FIG. 1 schematically shows a power system for use on a vehicle.

A vehicle 19, which may be a battlefield land vehicle is illustrated in FIG. 1 having an electric power architecture 20. A collector bus 22 distributes power to each of a 400 Hz subsystem 24, which is better illustrated in FIG. 2, a 60 Hz subsystem 26, which is better illustrated in FIG. 4, and a 28 volt DC subsystem 28.

Energy management dispatch units 30 communicate with pre-processing units 32. Feeding into the pre-processing units 32 are a number of power supplies 34, 36, 38, 40, 42, and 44. Elements 34 may be various types of generators. Element 36 may be a solar array. Element 38 may be a wind generator. Element 40 may be fuel cells. Element 42 may be a battery. Element 44 may be another type of energy storage device.

Any number of other energy sources can feed into the pre-processing units 32, and architectures which come within the scope of this application could also have fewer. All of these sources feed into the pre-processing units 32, which tailor the power such that it is uniform when it reaches collector bus 22. The energy management dispatch units 30 serve to connect or disconnect any one of the power supplies 34, 36, 38, 40, 42, and 44. This may be used if a power supply is corrupted, the component is otherwise inoperative, or for any number of other reasons.

Figure 2:
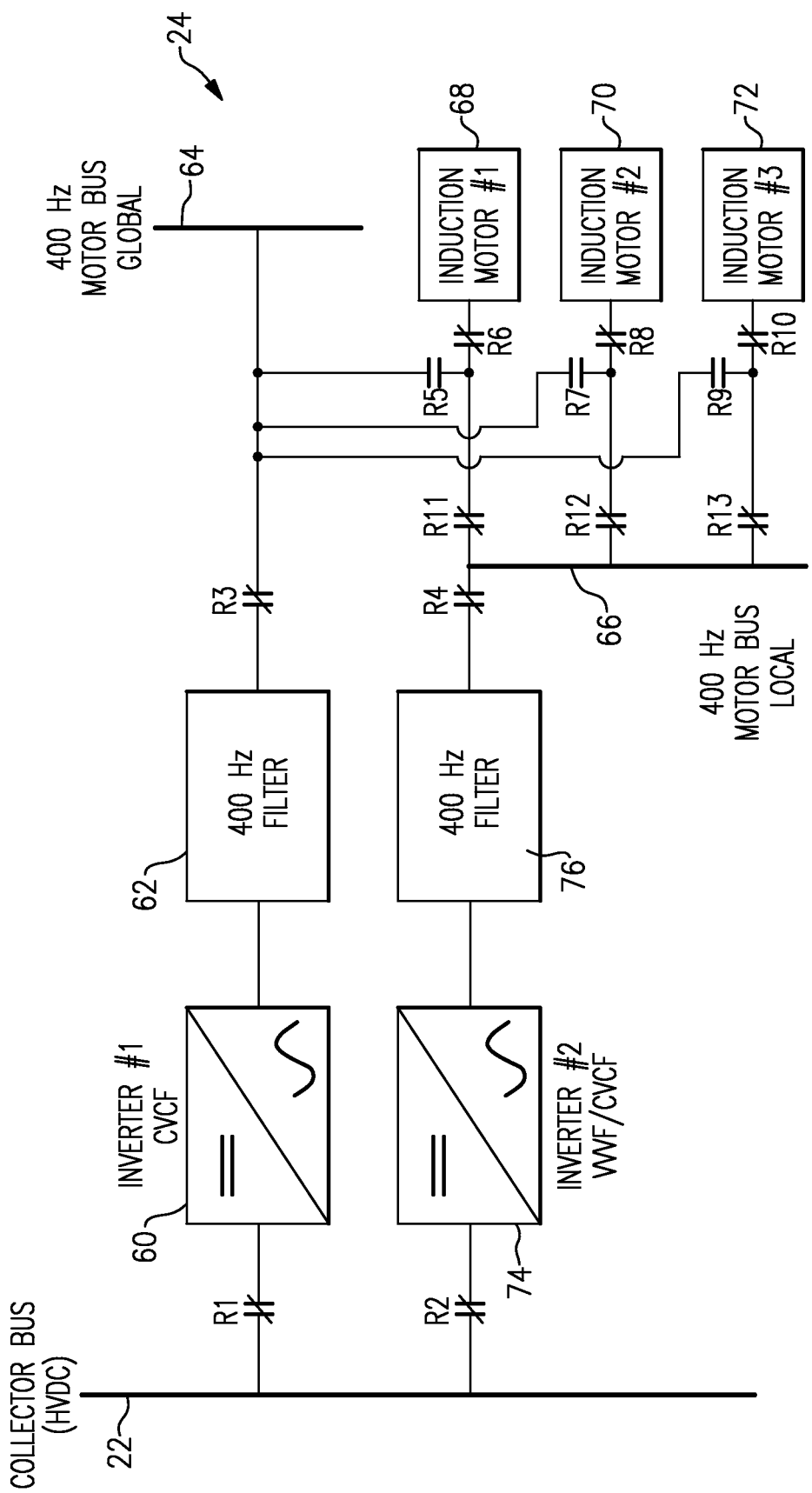
FIG. 2 shows a subsystem associated with a portion of the FIG. 1 schematic.

As shown in FIG. 2, the subsystem 24 includes a first inverter 60 which is a constant voltage, constant frequency inverter feeding through a 400 Hz filter 62. A number of contactors R1-R13 are illustrated. These contactors are each effectively switches which can be opened or closed by a central controller; therefore, the contactors are also referred to as switches. Any number of switches may be utilized as the contactors. Further, a control is associated with the contactors R1-R13 and is operable to control them to open and close as will be disclosed below.

When the switches R1, and R3, are closed, then power flows through the inverter 60 to a 400 Hz global motor bus 64. This bus is operable to provide power for components off the vehicle 19. That is, this would allow the user of the vehicle 19 to plug in components, etc., which are not mounted on the vehicle 19 but which are to be powered by the vehicle 19.

At the same time, a local motor bus 66 provides power to motors 68, 70 and 72. During start-up operation, power flows from the collector bus 22 through a second inverter 74, filter 76, to power the bus 66, and the motors 68, 70, and 72.

As also shown, further contactors R2, R4, R5, R6, R7, R8, and R9-R13 are all placed at various locations within the circuit.

In operating the subsystem 24 as illustrated in FIG. 2, the chart as shown in FIG. 3 is utilized to control the 13 contactors R1-R13 to be opened and closed. As shown, for example, at the start-up of the induction motor 1 (motor 68), the inverter 2 (inverter 74) is utilized to start up the induction motor 1. Once the induction motor 1 reaches a synchronous speed, then the contactor R5 is closed, contactor R11 is open, and the induction motor 68 is driven off the global bus 64. As can be seen in the FIG. 3 table, the induction motors 2 and 3 (motors 70 and 72) are started in a similar manner, while being powered from the variable voltage, variable frequency inverter 74. As can also be appreciated from FIG. 3, during certain times, the inverter 74 will operate as a constant voltage, constant frequency inverter. However, at start-up, it is operable as a variable voltage, variable frequency inverter.

Thus, by utilizing the two inverters 60, 74, the subsystem 24 is operable to start the motors 68-72 up with the variable voltage, variable frequency inverter, and then switch to the global bus 64, and powered by inverter 60 while the inverter 74 supplies power to the local bus 66.

In a sense, the local bus 66 is utilized to start the motors 68, 70 and 72, and they are then powered from the global bus 64 once steady state operation is achieved.

In addition, as can be appreciated from FIG. 3, the use of the redundant inverters 60, 74 allows the subsystem 24 to operate even if one of the inverters has failed. In addition, the use of the combined inverters 60, 74 eliminates the need for separate motor controls for each of the motors 68, 70, and 72.

Figure 4:
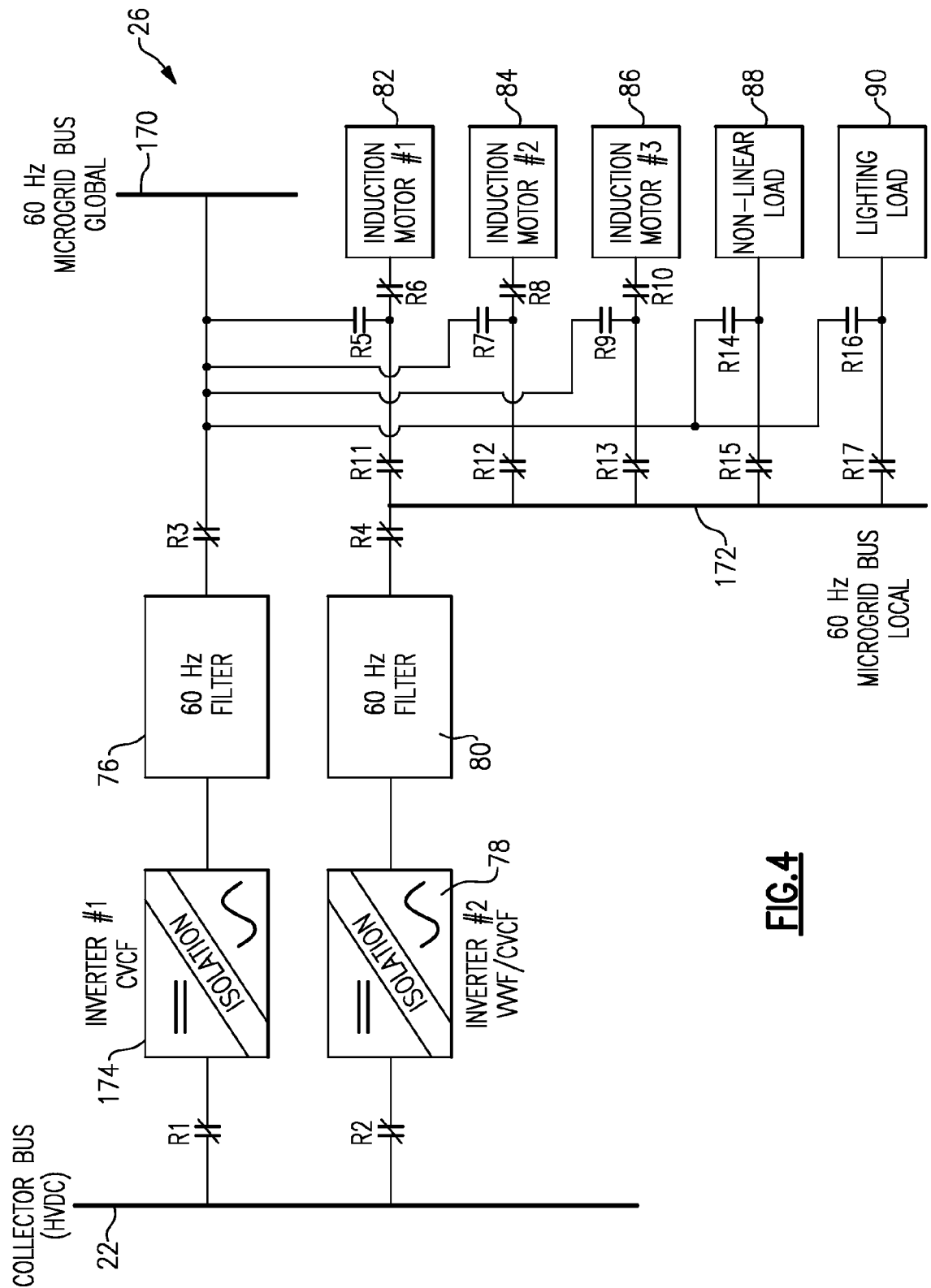
FIG. 4 shows another portion of the FIG. 1 schematic.

FIG. 4 shows a subsystem 26 for powering a 60 Hz subsystem. Again, a pair of inverters 174 and 78 provide power to a micro-grid global bus 170 through a filter 76, and to a local bus 172 through the filter 80. Contactors R1-R17 are operated in a manner similar to that disclosed in FIG. 3 to power induction motors 82, 84, and 86 to start and then run. In addition, non-linear loads 88 may be powered directly from the inverter 174. Similarly, the lighting loads 90 can be powered directly from the inverter 174 or the global bus 170.

Although embodiments of this invention have been disclosed, a worker of ordinary skill in this art would recognize that certain modifications would come within the scope of this invention. For that reason, the following claims should be studied to determine the true scope and content of this invention.

What is claimed is:

1. An electric architecture for use on a vehicle comprising:
a collector bus for receiving power from a plurality of power sources, said collector bus distributing power to at least a pair of subsystems which are each operating at different frequency levels, and each of said subsystems being provided with a global bus and a local bus, and being utilized to power at least one motor; and
each of said pair of subsystems is provided with a pair of inverters, a first inverter providing constant voltage and constant frequency, a second inverter providing variable voltage and variable frequency, and a plurality of switches controlled to use said second inverter, to provide power to said at least one motor at start-up, and until said at least one motor reaches a predetermined speed at which time said switches are changed such that power flows to said at least one motor through said first inverter, and such that said second inverter powers the local bus, while said first inverter powers the global bus.

2. The architecture as set forth in claim 1, wherein there are a plurality of motors powered by each of said subsystems.

3. The architecture as set forth in claim 2, wherein said switches are controlled to start each of said plurality of motors in sequence with said first and second inverters being controlled such that said second variable voltage, variable frequency inverter providing power to each of said motors at start-up, until each of said motors reaches a predetermined speed at which time said switches are changed such that power flows to each of said motors through said first inverter.

4. The architecture as set forth in claim 1, wherein said at least two different frequency levels include 60 Hz and 400 Hz.

5. The architecture as set forth in claim 1, wherein said first and second inverters replace each other should one of said first and second inverters fail.

6. The architecture as set forth in claim 1, wherein said second inverter is also operable as a constant voltage and constant frequency inverter after a predetermined time.

7. The architecture as set forth in claim 1, wherein said collector bus supplying power to each of said first and second inverters.

8. The architecture as set forth in claim 1, wherein said global bus providing power for components off of the vehicle, and said local bus providing power for motors included on the vehicle.

9. An electric architecture for use on a vehicle comprising:
a collector bus for receiving power from a plurality of power sources, said collector bus distributing power to at least a pair of subsystems which are each operating at different frequency levels, and each of said subsystems being provided with a global bus and a local bus, and being utilized to power a plurality of motors;
each of said pair of subsystems is provided with a first inverter providing constant voltage and constant frequency and a second inverter providing variable voltage and variable frequency, and a plurality of switches that allows said second variable voltage, variable frequency inverter to provide power to each of said plurality of motors in sequence, and until each said motor reaches a predetermined speed at which time said switches are changed such that power flows to each said motor through the first inverter, and such that said second inverter powers the local bus, while said first inverter switching to power the global bus;
said first and second inverters replace each other should one of said first and second inverters fail;
said second inverter is also operable as a constant voltage and constant frequency inverter after a predetermined time; and
at least one of said subsystems also powers at least one of a non-linear load, and a lighting load.

10. The architecture as set forth in claim 9, wherein said collector bus supplying power to each of said first and second inverters.

11. The architecture as set forth in claim 9, wherein said global bus providing power for components off of the vehicle, and said local bus providing power for motors included on the vehicle.

12. A method of operating an electric architecture for use on a vehicle lading the steps of:
receiving power from a plurality of power sources at a collector bus, said collector bus distributing power to at least a pair of subsystems operating at different frequency levels, and each of said pair of subsystems powering a global bus and a local bus, and powering at least one motor; and
each of said pair of subsystems is provided with a first inverter providing constant voltage and constant frequency and a second inverter providing variable voltage and variable frequency, and a plurality of switches using said second to provide power to said at least one motor at start-up, and once said at least one motor reaches a predetermined speed, said switches are changed such that power flows to said at least one motor through the first inverter, and such that said second inverter powering the local bus, while said first inverter powering the global bus.

13. The method as set forth in claim 12, wherein there are a plurality of motors powered by each of said subsystems.

14. The method as set forth in claim 12, wherein said switches are controlled to start each of said plurality of motors in sequence with said first and second inverters being controlled such that said second variable voltage, variable frequency inverter providing power to each of said motors at start-up, until each of said motors reaches a predetermined speed at which time said switches are changed such that power flows to each of said motors through said first inverter.

15. The method as set forth in claim 12, wherein said first and second inverters replace each other when one of said first and second inverters fail.

16. The method as set forth in claim 12, wherein said second inverter is also used as a constant voltage and constant frequency inverter after a predetermined time.

17. The method as set forth in claim 12, wherein said collector bus supplying power to each of said first and second inverters.

18. The method as set forth in claim 12, wherein said global bus providing power for components off of the vehicle, and said local bus providing power for motors included on the vehicle.

* * * * *